US010696008B2

(12) United States Patent
Lazur

(10) Patent No.: US 10,696,008 B2
(45) Date of Patent: Jun. 30, 2020

(54) TEXTILE MATERIAL JOINING TECHNIQUE

(71) Applicant: Rolls-Royce Corporation, Indianapolis, IN (US)

(72) Inventor: Andrew Joseph Lazur, Huntington Beach, CA (US)

(73) Assignee: Rolls-Royce Corporation, Indianapolis, IN (US)

(*) Notice: Subject to any disclaimer, the term of this patent is extended or adjusted under 35 U.S.C. 154(b) by 294 days.

(21) Appl. No.: 14/141,962

(22) Filed: Dec. 27, 2013

(65) Prior Publication Data
US 2014/0272246 A1    Sep. 18, 2014

Related U.S. Application Data

(60) Provisional application No. 61/790,822, filed on Mar. 15, 2013.

(51) Int. Cl.
*B32B 3/06* (2006.01)
*B32B 5/02* (2006.01)
(Continued)

(52) U.S. Cl.
CPC .......... *B32B 3/06* (2013.01); *B32B 5/024* (2013.01); *D03D 1/00* (2013.01); *D03D 3/04* (2013.01);
(Continued)

(58) Field of Classification Search
CPC . B32B 3/06; B32B 5/024; D03D 1/00; D03D 3/04; D10B 2505/02; Y10T 428/192
(Continued)

(56) References Cited

U.S. PATENT DOCUMENTS 4,048,277 A * 9/1977 Breznak ................. B65H 69/00
112/406
4,095,622 A * 6/1978 MacBean .............. D21F 1/0054
139/383 AA
(Continued)

FOREIGN PATENT DOCUMENTS

EP    0695827 A2    2/1996
EP    1897980 A1    3/2008
(Continued)

OTHER PUBLICATIONS

"Terminate" entry in Oxford English Dictionary, Third Edition (Year: 2017).*
(Continued)

*Primary Examiner* — Frank J Vineis
*Assistant Examiner* — Laura B Figg
(74) *Attorney, Agent, or Firm* — Brinks Gilson & Lione

(57) ABSTRACT

Techniques for joining textile materials are provided. In one non-limiting form, a system includes a woven structure having a first woven layer and at least a first section and a second section. The first section includes a first fringe portion and a first set of fibers, and the second section includes a second fringe portion and a second set of fibers. The fibers of the first and second sets of fibers are configured in the first and second fringe portions to provide an interlocking arrangement between the first and second sections. Further embodiments, forms, features, and aspects shall become apparent from the description and drawings.

27 Claims, 5 Drawing Sheets

(51) Int. Cl.
*D03D 1/00* (2006.01)
*D03D 3/04* (2006.01)

(52) U.S. Cl.
CPC ....... *D10B 2505/02* (2013.01); *Y10T 428/192* (2015.01)

(58) Field of Classification Search
USPC .......................................................... 428/58
See application file for complete search history.

(56) References Cited

U.S. PATENT DOCUMENTS

| | | | | | |
|---|---|---|---|---|---|
| 4,311,172 | A | * | 1/1982 | Eckstein | ............... D21F 1/0054 139/383 AA |
| 4,658,863 | A | * | 4/1987 | Errecart | ............... D21F 1/0054 139/383 AA |
| 5,436,042 | A | * | 7/1995 | Lau | ......................... C04B 35/80 264/28 |
| 5,939,216 | A | * | 8/1999 | Kameda | .................. C04B 35/08 428/323 |
| 2006/0016571 | A1 | * | 1/2006 | Silakoski | ................ D21F 7/083 162/358.2 |
| 2008/0261474 | A1 | * | 10/2008 | Goering | ................ B29C 70/222 442/195 |

FOREIGN PATENT DOCUMENTS

| | | |
|---|---|---|
| FR | 2970481 A1 | 7/2012 |
| WO | WO 03/031093 A1 | 4/2003 |

OTHER PUBLICATIONS

International Search Report and Written Opinion, dated Apr. 3, 2014 for International Application No. PCT/US2013/078212.
European Office Action, dated Nov. 16, 2018, pp. 1-6, issued in European Patent Application No. 13 826 700.0, European Patent Office, Munich, Germany.

* cited by examiner

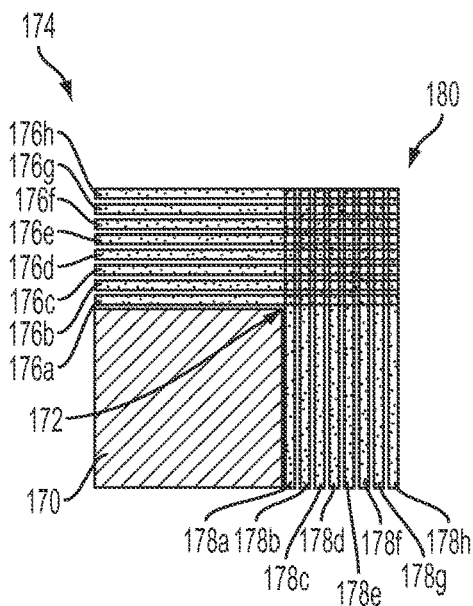
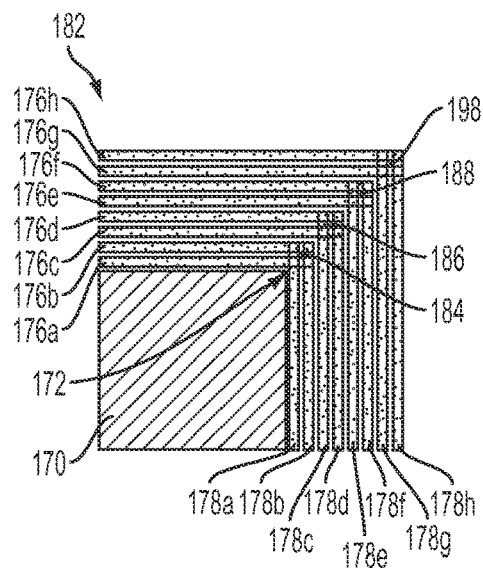
FIG. 11    FIG. 12
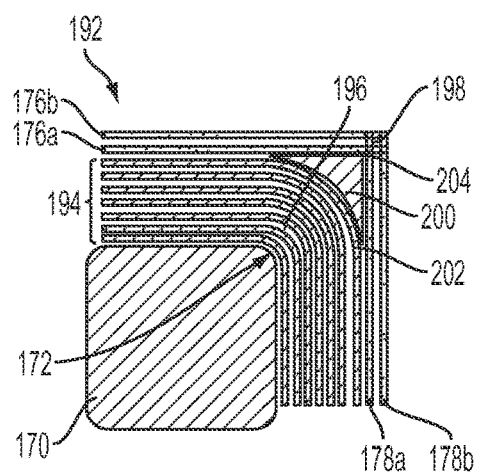
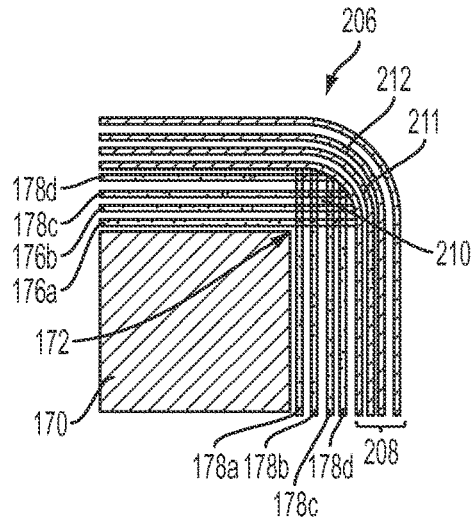
FIG. 13    FIG. 14
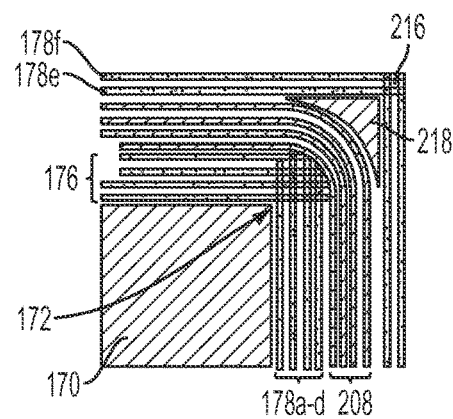
FIG. 15

TEXTILE MATERIAL JOINING TECHNIQUE

CROSS-REFERENCE TO RELATED APPLICATIONS

This application claims priority to U.S. Provisional Application Ser. No. 61/790,822, entitled "Textile Material Joining Techniques," filed Mar. 15, 2013, which is hereby incorporated by reference in its entirety.

BACKGROUND

The present application relates to joining textile or woven materials, and more particularly but not exclusively, to joining textile or woven materials in a manner configured to provide an interlocking arrangement between the materials.

Present approaches for joining textile or woven materials may be susceptible to failure or separation when exposed to certain stresses, and may also suffer from a variety of other limitations, including those relating to load transfer and the formation of certain shapes. Accordingly, there is a need for further improvements in this area of technology.

SUMMARY

One aspect of the present application is directed to a unique technique for joining textile or woven materials. Other aspects are directed to unique apparatuses, systems, devices, hardware, methods, kits, and/or assemblies related to joining textile or woven materials. Further embodiments, forms, features, aspects, benefits, and advantages of the present application shall become apparent from the description and figures provided herewith.

BRIEF DESCRIPTION OF THE FIGURES

FIGS. 8-15 are schematic illustrations of various arrangements for joining textile materials adjacent to a corner of a base form.

DETAILED DESCRIPTION OF THE REPRESENTATIVE EMBODIMENTS

Figure 1:
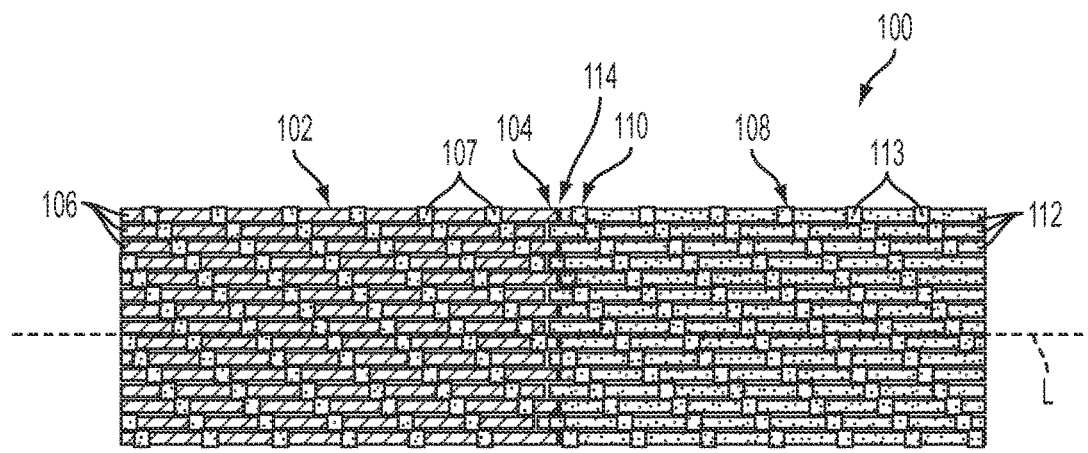
FIGS. 1-6 are schematic illustrations of various arrangements for joining textile materials.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Various non-limiting configurations for joining textile materials are disclosed herein. The textile materials described herein may be used to form a woven structure that includes one or more layers of textile or woven materials, and each layer may include one or more pieces or sections of the textile materials that are joined together. Forms in which one or more layers formed from a continuous section of textile material are present with one or more layers that include one or more pieces or sections of the textile materials joined together are also possible. The resultant woven structure may be used as a preform which can be infiltrated with a matrix material to form a composite. Non-limiting examples of matrix materials include polymeric, metallic and ceramic materials. Some exemplary ceramic materials that could be used for the matrix material include silicon carbide, silicon/silicon carbide, and hybrids thereof, just to provide a few non-limiting possibilities. The textile materials may be a 2D fabric, 3D textile, unidirectional fabric, dry non-woven textile, and/or infused or pre-impregnated with binders, and may further include particulates, whiskers, or other fillers. In addition, the textile materials may include fibers formed from glass, carbon, aramid, ceramic oxide, ceramic nitride, ceramic carbide such as Nicalon, mullite, alumina, and combinations thereof, just to provide a few examples.

Turning now to FIG. 1, further details of a system or arrangement 100 for joining textile materials will be provided. More particularly, a first section 102 of textile material includes a fringe portion 104 and a plurality of fibers 106 and 107, only a few of which have been identified for the sake of clarity. In the illustrated form, fibers 106 extend in line with longitudinal axis L, although forms in which the orientation of fibers 106 may deviate from that shown in FIG. 1 are possible. A second section 108 of textile material includes a fringe portion 110 and a plurality of fibers 112 and 113, only a few of which have been identified for the sake of clarity. Fibers 112 extend in line with longitudinal axis L, although forms in which the orientation of fibers 112 may deviate from that shown in FIG. 1 are possible. In the illustrated form, a joining portion 114 is formed by fringe portions 104, 110 to provide an interlocking arrangement between first section 102 and second section 108. More particularly, fibers 106, 112 are configured in fringe portions 104, 110 in a manner that facilitates formation of joining portion 114.

In the embodiment illustrated in FIG. 1, a portion of fibers 106, 112 is removed along longitudinal axis L in fringe portions 104, 110 to enable interlocking in joining portion 114 where a number of fibers 106 are positioned adjacent to and overlapping along longitudinal axis L with a number of fibers 112. Similarly, a portion of a number of fibers 106 is positioned between a portion of a number of fibers 112 and vice versa. The portion of fibers 106, 112 that is removed can vary in length and pattern. For an in-plane joining of sections 102, 108, the length of the removed portions of fibers 106,112 can vary between a number of different weaving increments taken along longitudinal axis L. The pattern of removed or modified fibers can be one which alternates between fringe portions 104, 110 with various repeating patterns. The trimmed fringe length may also be staggered to distribute stress concentration more uniformly.

Figure 2:
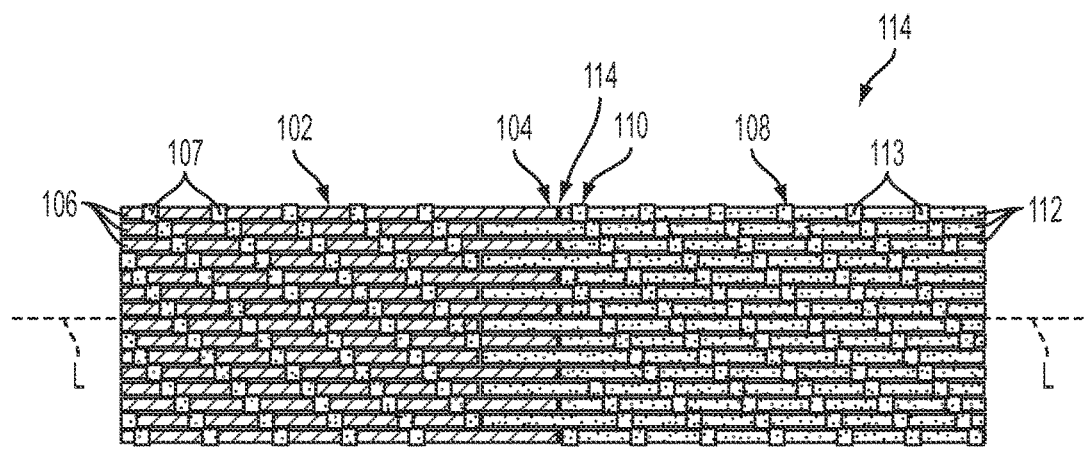

In FIG. 1, the removed portions of fibers 106, 112 have a length along longitudinal axis L that corresponds to a single weaving increment, and alternate in a single pattern between fringe portions 104, 110. In FIG. 2, where like numerals refer to like features previously described, arrangement 114 includes fibers 106, 112 in fringe portions 104, 110 with portions having a length along longitudinal axis L that corresponds to a 5-unit weaving increment removed in a single alternating pattern between fringe portions 104, 110.

Figure 3:
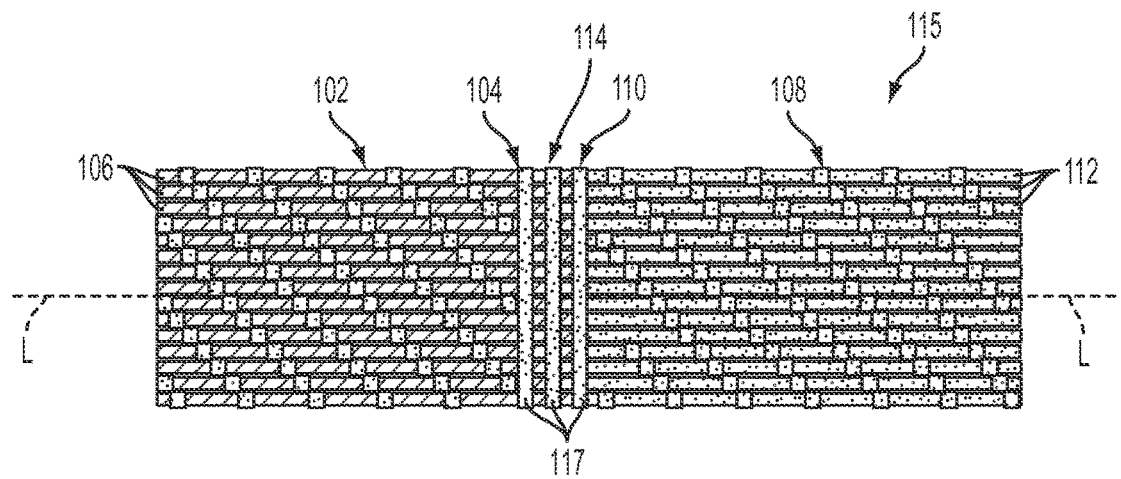

Arrangement 115 illustrated in FIG. 3, where like numerals refer to like features previously described, is substantially similar to arrangement 114 illustrated in FIG. 2. In contrast to arrangement 114 however, arrangement 115 includes a number of support fibers 117 positioned in joining portion 114. Support fibers 117 generally extend transversely, and more particularly orthogonally, to longitudinal axis L and fibers 106, 112, although forms in which the orientation of support fibers 117 differs from that illustrated are possible. Other variations possible in connection with support fibers 117 include the number of such fibers present, their positioning relative to fringe portions 104, 110, and whether one or more of fibers 106, 112 is woven with one or more of support fibers 117. In certain forms, support fibers 117 can be a group of fibers such as a tow or a monofilament and can vary in material properties from fibers 106, 107, 112, and 113. The particular properties and parameters of support fibers 117 may be selected to maintain a desired fiber volume and/or to add compaction or thickening of joining portion 114.

Figure 4:
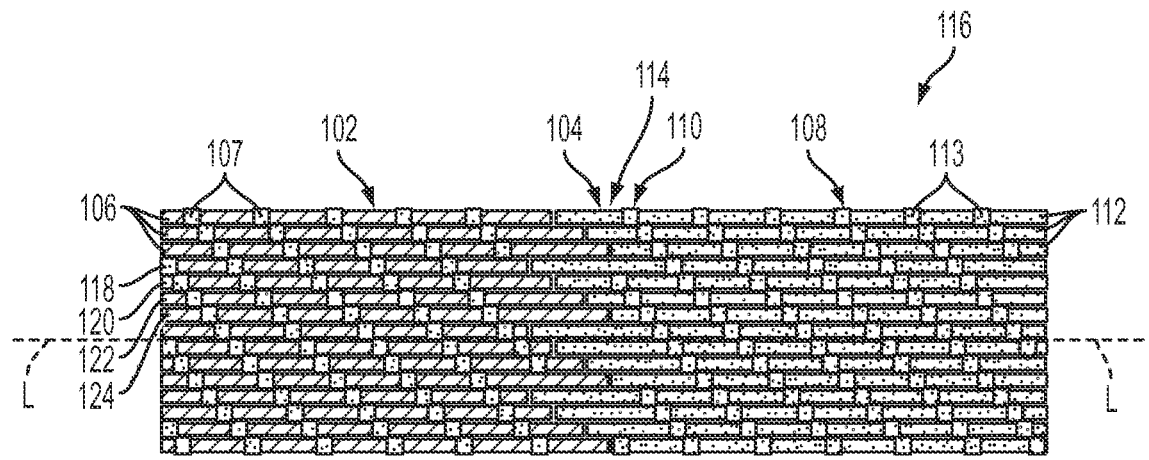

FIG. 4 illustrates yet another arrangement 116, where like numerals refer to like features previously described and the lengths of the removed portions of fibers 106, 112 along longitudinal axis L vary. More particularly, six (6) weaving increments are removed from fiber 106 of row 118 of fringe portion 104, four (4) weaving increments are removed from fiber 106 of row 120 of fringe portion 104, two (2) weaving increments are removed from fiber 106 of row 122 of fringe portion 104, and no weaving increments are removed from row 124 of fringe portion 104. This pattern repeats through the remaining rows of fibers 106 in fringe portion 104 and alternates with fibers 112 of fringe portion 108. For example, no weaving increments are removed from fiber 112 of row 118 of fringe portion 110, two (2) weaving increments are removed from fiber 112 of row 120 of fringe portion 110, four (4) weaving increments are removed from fiber 112 of row 122 of fringe portion 110, and six (6) weaving increments are removed from fiber 112 of row 124 of fringe portion 110. This pattern repeats through the remaining rows of fibers 112 in fringe portion 110. In other embodiments, it is contemplated the pattern can vary for the remaining rows of fibers 106, 112 in fringe portions 104, 110.

In the forms illustrated in FIGS. 1-4, first and second sections 102, 108 extend in-line with longitudinal axis L. In addition, the ends of first and second sections 102, 108 adjacent to fringe portions 104, 110 generally extend orthogonally to longitudinal axis L. However, forms in which one or both of sections 102, 108 extend transversely to longitudinal axis L and/or the ends of first and second sections 102, 108 adjacent to fringe portions 104, 110 do not extend orthogonally to longitudinal axis L are contemplated and possible. In these forms, it should be understood that portions of fibers 106, 112 can be removed in a stepped pattern to match the orientation of the ends of sections 102, 108 relative to one another and longitudinal axis L. It should further be understood that the forms in FIGS. 1-4 are exemplary only, and that the exact dimension and patterns of the removed and interlocked portions of fibers 106, 112 can vary. In addition, it is contemplated that the removal of portions of fibers 106, 112 can be done in any suitable manner. For example, a notched shear process or an automatic fabric cutting system may be utilized for removal of the portions of fibers 106, 112 in fringe portions 104, 110.

Figure 5:
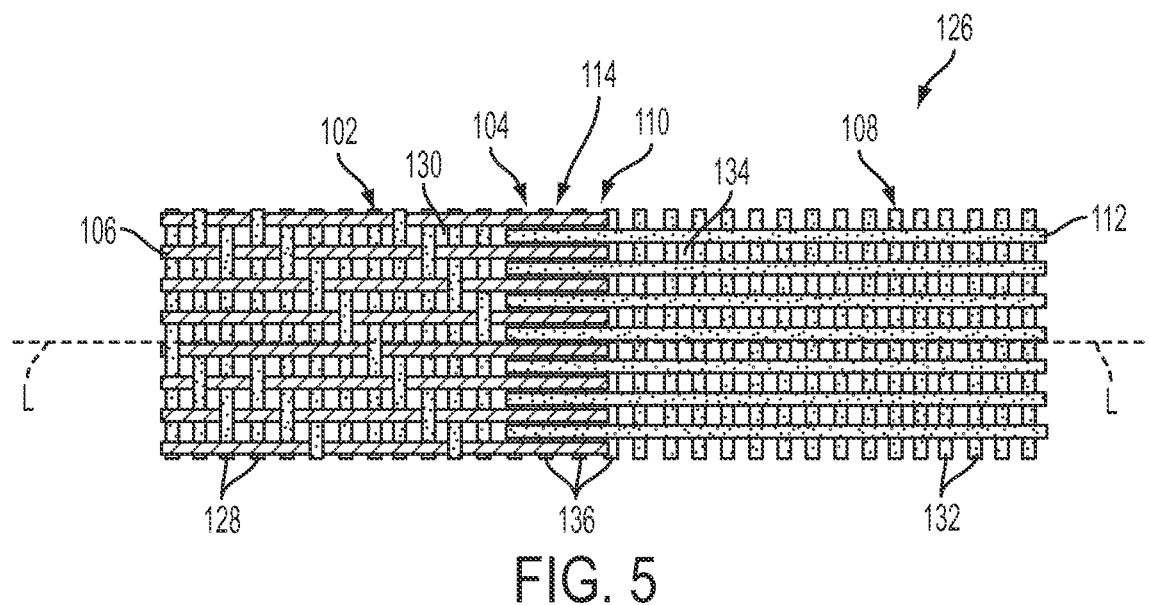

FIG. 5, where like numerals refer to like features previously described, illustrates arrangement 126 for joining textile materials that have open weave patterns. The open weave pattern can allow spacing for fibers 106, 112 of fringe portions 104,110 to interlock when joining portion 114 is formed. One or more fibers 106, 112 may also be removed in one direction or another on one or both of sections 102, 108. The open weave pattern may also vary in spacing between fibers 106, 112 and include fibers in various orientations.

In arrangement 126 illustrated in FIG. 5, section 102 includes fibers 106 which are weaved with cross fibers 128 to provide an open weave 130 between fibers 106 which is approximately the width of fibers 112. Section 108 includes fibers 112 which are weaved with cross fibers 132 to provide an open weave 134 between fibers 112 which is approximately the width of fibers 106. Fibers 106 in fringe portion 104 are positioned in open weave 134 between fibers 112 of fringe portion 110 and vice versa. Cross fibers 128, 132 which extend perpendicular to fibers 106, 112 can be removed from fringe portions 104, 110 and support fibers 136 can be placed on either surface of joining portion 114 following its formation. In one form, one or more of fibers 106, 112 can be woven into support fibers 136. In various embodiments, cross fibers 128, 132 can be at various orientations and multiple cross fiber orientations can be present in first and second sections 102, 108. In addition, support fibers 136 may extend at various orientations and multiple cross fiber orientations can be present in joining portion 114. It should also be understood that cross fibers 128, 132 can be removed without placing support fibers 136. In one non-illustrated embodiment, cross fibers 128, 132 may be left in place in fringe portions 104, 110 and fibers 106, 112 can be woven into cross fibers 132, 128, respectively in open weave 130, 134. Forms in which open weave 130 includes a varied pattern configured to receive a single one of fibers 112 at one location and more than one of fibers 112 at another location, and fibers 112 are correspondingly configured, are also possible. Open weave 134 and fibers 106 could also be provided with this configuration.

Figure 6:
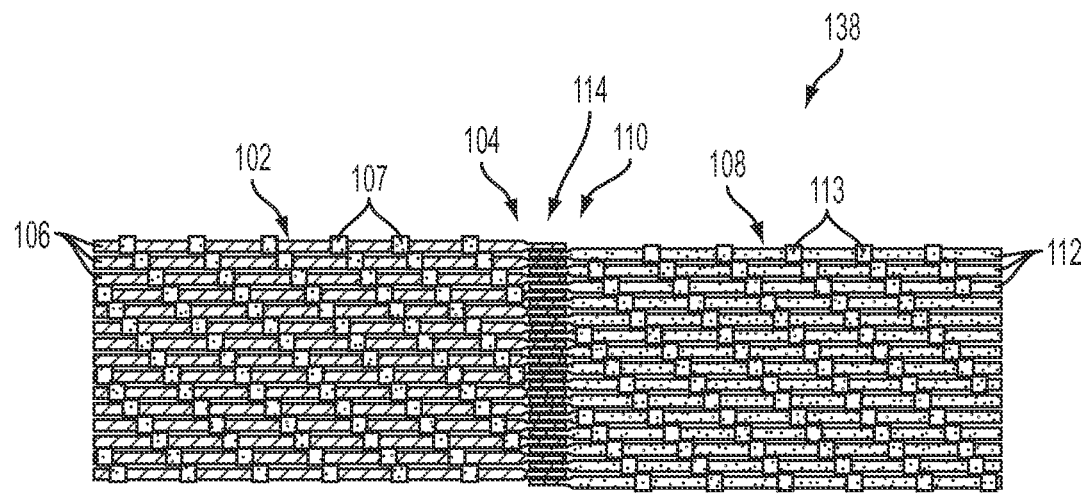
Figure 7A:
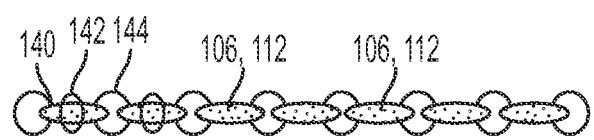
FIGS. 7A and 7B are schematic illustrations of cross-sectional configurations of fibers in the fringe portions of the textile materials in FIG. 6.
Figure 7B:
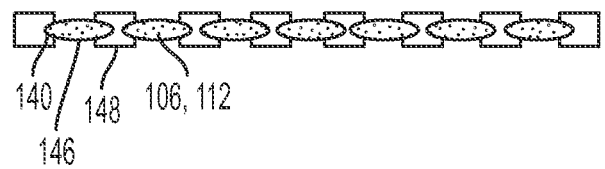

Another alternative arrangement 138 for joining sections 102, 108 is illustrated in FIG. 6, where like numerals refer to like features previously described. In arrangement 138, the cross-sectional shape or configuration of fibers 106, 112 has been modified in fringe portions 104, 110, respectively, in order to facilitate formation of joining portion 114 without removing material or utilizing an open weave configuration. Non-limiting examples of the modifications that can be made to the cross-sectional shape or configuration of fibers 106, 112 in fringe portions 104, 110 are illustrated in FIGS. 7A and 7B. In the form illustrated in FIG. 7A, fibers 106, 112 initially include a generally oval cross-sectional shape 140 which is reshaped to provide fibers 106, 112 with a generally circular cross-sectional shape 142 in fringe portions 104, 110. As a result of this modification, a number of circular openings 144 configured to receive a respective one of reshaped fibers 106, 112 are formed. In the form illustrated in FIG. 7B, fibers 106, 112 initially include a generally oval cross-sectional shape 140 which is reshaped to provide fibers 106, 112 with a generally square cross-sectional shape 146 in fringe portions 104, 110. As a result of this modification, a number of square openings 148 configured to receive a respective one of reshaped fibers 106, 112 are formed. One non-limiting approach for modifying fibers 106, 112 in these manners involves the application of a temporary binder to fibers 106, 112 which are then reshaped to create the spaces discussed above.

It is also contemplated that forms involving reshaped fibers can also include the removal of portions of fibers 106, 112 as discussed above. For example, a joining portion with a taper may be formed by reshaping fibers and removing portions of fibers 106, 112 to match the taper of the joining portion.

While the above disclosed arrangements for joining textile materials have been described in connection with sections 102 and 108 being in-plane with one another, it should also be understood that these arrangements may be used in forms where sections 102 and 108 are not in-plane with one another. In these forms, joining portion 114 may be the location of a bend, corner or other geometric configuration in a layer formed by sections 102 and 108, and the bend can include any angle between 0° and 180°. In these forms, a number of fibers 106, 112 in fringe portions 104, 110 can be provided with a length that allows fibers 106, 112 of sections 102, 108 to further extend through and interlock with fibers of one or more additional layers of textile materials positioned over sections 102 and 108.

Figure 8:
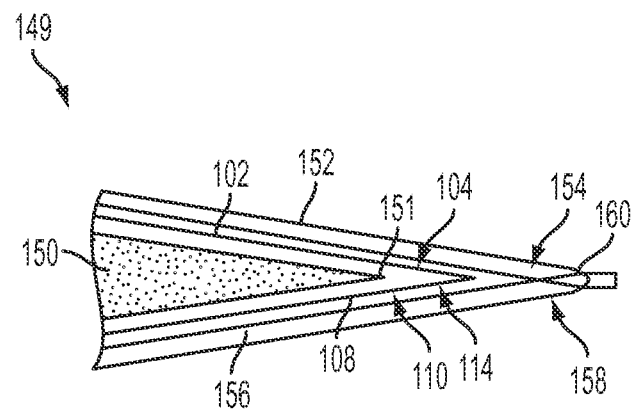

FIG. 8 illustrates an arrangement 149 where first and sections 102, 108 are positioned relative to a base form 150 such that joining portion 114 is positioned adjacent to corner 151 of base form 150 and is formed at an intersecting angle of less than 180°. Variations in the shape and angle of corner 151 are possible, including forms in which corner 151 is rounded or convexly curved. A third section 152 of textile material that includes a fringe portion 154 having fibers arranged similar to that of fringe portion 104 for example is positioned over first section 102, and a fourth section 156 of textile material that includes a fringe portion 158 having fibers arranged similar to that of fringe portion 110 for example is positioned over second section 108. Fringe portions 154, 158 interlock to provide an arrangement similar to one of those discussed herein above and otherwise form a second joining portion 160. In the illustrated form, arrangement 149 includes two layers of textile materials; it should be appreciated however that additional layers of textile materials could be present and arranged similar to sections 102, 108, 152 and 156.

Figure 9:
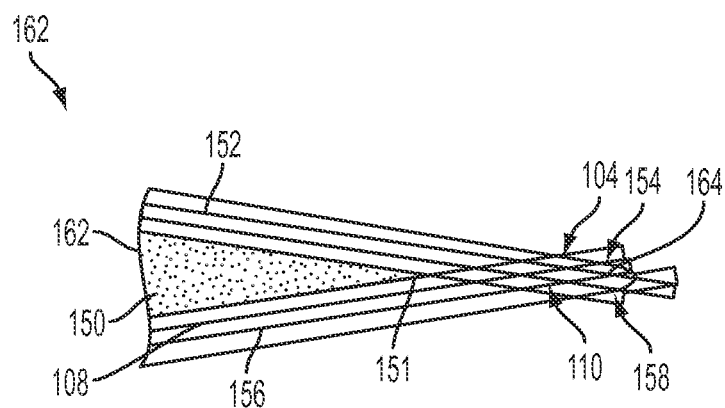

Arrangement 162 illustrated in FIG. 9, where like numerals refer to like features previously described, is similar to arrangement 149. However, instead of including separate joining portions 114, 160, arrangement 162 includes a single joining portion 164 formed by fringe portions 104, 110 of first and second sections 102, 108 and fringe portions 154, 158 of third and fourth sections 152, 156. More particularly, it should be understood that the fibers of fringe portions 104, 110 are provided with a length that allows them to interlock with the fibers of fringe portions 154, 158 such that joining portion 164 includes an interlocking arrangement between fringe portions 104, 110, 154, and 158. The interlocking arrangement of joining portion 164 may be similar to one or more of the arrangements discussed herein above. It should also be appreciated that forms in which the fibers of fringe portions 104, 110 and 154, 158 are provided with a length that facilitates interlocking with fibers of fringe portions of one or more additional layers positioned over sections 152, 156 to provide a single joining portion between all layers are possible.

Figure 10:
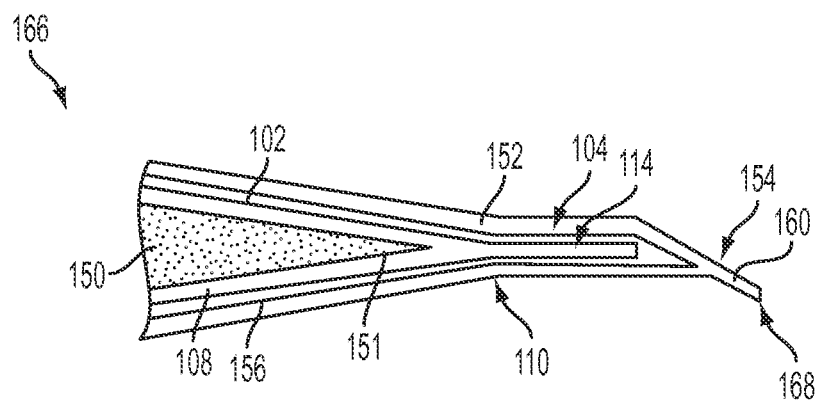

FIG. 10 illustrates another arrangement 166 that is similar to arrangement 149. In arrangement 166, joining portion 114 is elongated relative to its configuration in arrangement 149, and joining portion 160 is offset from and extends obliquely to joining portion 114 to form a trailing edge 168. In general, the arrangement shown in FIG. 10 may be useful for designs having complex geometry, sharp corners or thick fabric sheets, just to provide a few examples. While not previously discussed, it should be appreciated that the interlocking arrangement of fibers from different sections of textile materials allows the joining portion to have a thickness that corresponds to the thickness of a single section of textile material. Further, this thickness of the joining portion is typically one half of what the thickness of the joining portion would be if the sections of textile materials were placed on top of one another without any interlocking arrangement.

FIGS. 11-15 illustrate alternative arrangements for joining textile materials relative to a corner 172 of a base form 170. In FIGS. 11-12 and 14-15, corner 172 has a generally linear configuration forming a ninety degree angle, while corner 172 has a curved or radiused configuration in FIG. 13. It should be understood that the configuration of corner 172 may further vary in other non-illustrated forms. It should also be understood that the arrangements illustrated in FIGS. 11-15 are exemplary only, and that related arrangements also fall within the scope of the present application.

FIG. 11 illustrates an arrangement 174 that includes a plurality of layers formed by textile sections 176*a-h* and 178*a-178h*. Each of sections 176*a-h* and 178*a-h* includes a fringe portion similar to one or more of those described herein that facilitates an interlocking arrangement similar to one or more of those discussed above between sections 176*a-h* and 178*a-h* that forms a single joining portion 180. In this configuration, the fibers in the fringe portion of each of sections 176*a-h* extend transversely to the fibers of sections 178*a-h* and are provided with a length that facilitates interlocking with the fringe portions of sections 178*a-h*. The fibers in the fringe portion of each of sections 178*a-h* extend transversely to the fibers of sections 176*a-h* and are provided with a length that facilitates interlocking with the fringe portions of sections 178*a-h*. For example, the fibers of the fringe portion of section 178*a* are configured to extend through and interlock with the fibers in the fringe portion of each of sections 178*a-h*. Forms in which one or more of sections 176*a-h* and 178*a-h* extend through less than each layer present are also possible.

FIG. 12 illustrates another arrangement 182, where like numerals refer to like features previously described. In arrangement 182, the fibers of the fringe portions of sections 176*a-h* and 178*a-h* do not extend through all the present layers. Rather, the fringe portions of sections 176*a-b* and 178*a-b* interlock and form a first joining portion 184, the fringe portions of sections 176*c-d* and 178*c-d* interlock and form a second joining portion 186, the fringe portions of sections 176*e-f* and 178*e-f* interlock and form a third joining portion 186, and the fringe portions of sections 176*g-h* and 178*g-h* interlock and form a fourth joining portion 190. In both FIGS. 11 and 12, corner 172 is generally linear, and joining portions 180 and 184-190 are shown with an angle of incidence between sections 176*a-h* and sections 178*a-h* which follows the shape of corner 172. It is contemplated however that the angle of incidence can vary through the arrangement to accommodate various bend features.

FIG. 13 illustrates yet another arrangement 192, where like numerals refer to like features previously described. A plurality of continuous layers 194 of a material, such as a textile material, are positioned adjacent to base form 170 and include a radiused portion 196 that approximates the radius of corner 172. Sections 176*a-b* and 178*a-b* are positioned over layers 194 and form a joining portion 198 where an interlocking arrangement is formed by fibers of fringe portions of sections 176*a-b* and 178*a-b*. A filler 200 is placed between layers 194 and sections 176*a-b* and 178*a-b*. Filler 200 has a first side geometry 202 that follows the curvature of layers 194 and a second side geometry 204 having a generally linear configuration. Sections 176*a-b* and 178*a-b* are shown forming joining portion 198 with an angle of incidence that approximates the shape of second side 204 of filler 200.

FIG. 14 illustrates yet another arrangement 206, where like numerals refer to like features previously described. Sections 176*a-d* and 178*a-d* are positioned adjacent to base form 170 and the fibers of the fringe portions of these sections interlock to form joining portion 210. Joining portion 210 includes a complimentary shape to corner 172 along an inner portion and a radiused configuration 211 along an outer portion. A number of continuous layers 208 of material, such as a textile material, are positioned over sections 176a-d and 178a-d and include an outer radius of curvature 212 that corresponds to radiused configuration 211 of joining portion 210. It is contemplated that radiused configuration 211 can be formed by various approaches including, but not limited to, removal of fibers or portions of fibers by mechanical or thermal processes, selecting certain lengths, or utilizing various weaving patterns.

Arrangement 214 illustrated in FIG. 15, where like numerals refer to like features previously described, is similar to arrangement 206. In addition to the features described in connection with arrangement 206 however, arrangement 214 includes sections 176e-f and 178e-f positioned over layers 208 and form a joining portion 216 where an interlocking arrangement is formed by fibers of fringe portions of sections 176e-f and 178e-f. A filler 218 is placed between layers 208 and sections 176e-f and 178e-f. Filler 218 has a first side geometry that follows the curvature of layers 208 and a second side geometry having a generally linear configuration. Sections 176e-f and 178e-f are shown forming joining portion 216 with an angle of incidence that approximates shape of the second side of filler 218.

In various embodiments, different portions and woven layers of a woven structure can be varied to accommodate various bend features, thicknesses, material properties, outer profiles, and the like. More or fewer woven layers, continuous layers or fabric sheets than shown can be applied.

In one embodiment, a woven structure includes a first woven layer and at least a first section and a second section. The first section includes a first fringe portion and a first set of fibers, and the second section includes a second fringe portion and a second set of fibers. The fibers of the first and second sets of fibers are configured in the first and second fringe to provide an interlocking arrangement between the first and second sections.

In another embodiment, a system includes a first woven layer including a first section and a second section. The first section including a first set of fibers extending therefrom and the second section including a second set of fibers extending therefrom, and the first set of fibers extend transversely to and interlock with the second set of fibers adjacent to a corner of a base form.

In still another embodiment, a method includes providing a first section of a woven material and a second section of the woven material, and positioning the first section adjacent to the second section with a first number of fibers extending from the first section positioned between a second number of fibers extending from the second section to provide an interlocking arrangement between the first and second sections.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed:

1. A ceramic matrix composite component comprising:
   a woven structure ceramic preform comprising a first woven layer, the first woven layer including at least a first section and a second section, the first section including a first fringe portion having a first set of ceramic fibers, and the second section including a second fringe portion having a second set of ceramic fibers, wherein the first set of ceramic fibers of the first fringe portion and the second set of ceramic fibers of the second fringe portion provide an interlocking arrangement between the first and second sections within a joining portion, wherein the first fringe portion and the second fringe portion are not woven in the joining portion where the interlocking arrangement is provided, wherein a first number of the first set of ceramic fibers of the first fringe portion is configured to extend a shorter length into the joining portion than a second number of fibers of the first set of ceramic fibers of the first fringe portion, and wherein each of the first number of ceramic fibers and the second number of ceramic fibers include a cut end within the joining portion; and
   a matrix material infiltrated into the woven structure ceramic preform.

2. The ceramic matrix composite component of claim 1, wherein:
   the first fringe portion includes a plurality of spaces transversely positioned between the fibers of the first set of ceramic fibers, the spaces each being configured to receive at least one of the fibers of the second set of ceramic fibers; and
   the second fringe portion includes a plurality of spaces transversely positioned between the fibers of the second set of ceramic fibers, the spaces each being configured to receive at least one of the fibers of the first set of ceramic fibers.

3. The ceramic matrix composite component of claim 1, wherein one or more of the fibers of the first and second sets of ceramic fibers includes a first portion having a modified cross-sectional configuration relative to a second portion.

4. The ceramic matrix composite component of claim 3, wherein the first portion of the one or more fibers is positioned in the first and second fringe portions.

5. The ceramic matrix composite component of claim 1, further including at least one support fiber positioned approximate the interlocking arrangement and extending transversely to the fiber or the first and second sets of ceramic fibers.

6. The ceramic matrix composite component of claim 5, wherein the at least one support fiber is positioned on a surface of the first woven layer.

7. The ceramic matrix composite component of claim 1, further comprising a number of woven layers in addition to the first woven layer.

8. The ceramic matrix composite component of claim 1, further comprising a number of woven layers in addition to the first woven layer, wherein:
   each of the additional woven layers includes a first section and a second section;

the first section of each of the additional woven layers includes a first fringe portion and a first set of ceramic fibers, and the second section of each of the additional woven layers includes a second fringe portion and a second set of ceramic fibers; and the fibers of the first and second sets of ceramic fibers of a respective woven layer are configured to provide an interlocking arrangement between the first and second sections of the respective woven layer.

9. The ceramic matrix composite component of claim 1, further comprising a number of woven layers in addition to the first woven layer, wherein:

each of the additional woven layers includes a first section and a second section;

the first section of each of the additional woven layers includes a first fringe portion and the second section of each of the additional woven layers includes a second fringe portion; and the first and second fringe portions of each woven layer are joined together by the interlocking arrangement.

10. The ceramic matrix composite component of claim 1, wherein the interlocking arrangement is formed by the first and second fringe portions and is elongated and extends away from the first and second sections.

11. The ceramic matrix composite component of claim 1, wherein the interlocking arrangement includes a number of fibers of the first set of ceramic fibers positioned adjacent to and extending alongside a number of fibers of the second set of ceramic fibers to provide an overlapping arrangement between the first and second fringe portions.

12. The ceramic matrix composite component of claim 1, wherein the interlocking arrangement includes a number of fibers of the first set of ceramic fibers extending transversely to and positioned between a number of fibers of the second set of ceramic fibers.

13. The ceramic matrix composite component of claim 12, further comprising a number of woven layers in addition to the first woven layer, wherein:

each additional woven layer includes a first section and a second section;

the interlocking arrangement includes a number of fibers of the first set of ceramic fibers of the first woven layer extending transversely to and positioned between a number of fibers of a set of ceramic fibers of one or more of the additional woven layers.

14. The ceramic matrix composite component of claim 1, further comprising a matrix material infiltrating the first woven layer.

15. The ceramic matrix composite component of claim 1, wherein the interlocking arrangement between the first and second sections is fixed in place by the infiltrated matrix material.

16. The ceramic matrix composite component of claim 1, wherein a third number of fibers of the first set of ceramic fibers of the first fringe portion are configured to terminate before extending into the joining portion.

17. A ceramic matrix composite component comprising:

a woven structure ceramic preform comprising a first woven layer, the first woven layer including at least a first section and a second section, the first section including a first fringe portion having a first set of ceramic fibers, each of the first set of ceramic fibers having a fiber end, and the second section including a second fringe portion having a second set of ceramic fibers, each of the second set of ceramic fibers having a fiber end, wherein the first set of ceramic fibers of the first fringe portion and the second set of ceramic fibers of the second fringe portion provide an interlocking arrangement between the first and second sections within a joining portion, wherein the first fringe portion and the second fringe portion are not woven in the joining portion where the interlocking arrangement is provided, wherein a first number of the first set of ceramic fibers of the first fringe portion is configured to extend a shorter length into the joining portion than a second number of fibers of the first set of ceramic fibers of the first fringe portion, and wherein each of the fiber ends of the first number of ceramic fibers and each of the fiber ends of the second number of ceramic fibers terminate within the joining portion; and a matrix material infiltrated into the woven structure ceramic preform.

18. The ceramic matrix composite component of claim 17, wherein the fiber ends of the first number of ceramic fibers and the second number of ceramic fibers project only linearly into the joining portion.

19. The ceramic matrix composite component of claim 17, wherein each of the first set of ceramic fibers is cut at the fiber end, each of the second set of ceramic fibers is cut at the fiber end.

20. A ceramic matrix composite system comprising a first woven layer including a first section and a second section, the first section including a first fringe portion having a first set of ceramic fibers extending from the first section and the second section including a second fringe portion having a second set of ceramic fibers extending from the second section, wherein the first set of ceramic fibers extend transversely to and interlock with the second set of ceramic fibers within an unwoven joining portion adjacent to a corner of a base form, wherein the first fringe portion and the second fringe portion are each not woven in the unwoven joining portion where the first and second sets of ceramic fibers interlock, wherein a first number of fibers of the first set of ceramic fibers of the first fringe portion extends a shorter length into the joining portion than a second number of fibers of the first set of ceramic fibers of the first fringe portion, and wherein each of the first number of fibers and the second number of fibers include a cut end within the joining portion.

21. The system of claim 20, further comprising a second woven layer.

22. The system of claim 21, further comprising a second woven layer, and wherein the second woven layer is positioned between the first woven layer and the corner of the base form.

23. The system of claim 22, wherein the second woven layer extends continuously about the corner of the base form.

24. The system of claim 21, further comprising a second woven layer, and wherein the first woven layer is positioned between the second woven layer and the corner of the base form.

25. The system of claim 21, wherein the corner of the base form includes a convex radius.

26. The system of claim 21, wherein a number of fibers of the first set of ceramic fibers are individually positioned between a number of fibers of the second set of ceramic fibers.

27. The system of claim 21, further comprising a number of woven layers in addition to the first woven layer, wherein each of the additional woven layers includes a first section and a second section and the first set of ceramic fibers of the first woven layer further interlock with a set of ceramic fibers of one or more of the additional woven layers.

* * * * *